(12) United States Patent
Mori

(10) Patent No.: US 9,813,424 B2
(45) Date of Patent: Nov. 7, 2017

(54) COMMUNICATION SYSTEM, SERVER, AND CLIENT DEVICE

(71) Applicant: BROTHER KOGYO KABUSHIKI KAISHA, Nagoya-shi, Aichi-ken (JP)

(72) Inventor: Takafumi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 338 days.

(21) Appl. No.: 14/726,879

(22) Filed: Jun. 1, 2015

(65) Prior Publication Data

US 2015/0372879 A1  Dec. 24, 2015

(30) Foreign Application Priority Data

Jun. 24, 2014  (JP) ................. 2014-129000

(51) Int. Cl.
| | | |
|---|---|---|
| G06F 15/16 | (2006.01) | |
| H04L 29/06 | (2006.01) | |
| H04L 29/12 | (2006.01) | |

(52) U.S. Cl.
CPC ........ *H04L 63/107* (2013.01); *H04L 61/2007* (2013.01); *H04L 61/2061* (2013.01); *H04L 61/2514* (2013.01); *H04L 63/08* (2013.01)

(58) Field of Classification Search
CPC ............... H04L 63/107; H04L 61/2007; H04L 61/2061; H04L 61/2514; H04L 63/08
See application file for complete search history.

(56) References Cited

U.S. PATENT DOCUMENTS

| | | | | |
|---|---|---|---|---|
| 7,161,897 B1 * | 1/2007 | Davies | ............. | H04L 45/22 370/217 |
| 7,203,832 B2 * | 4/2007 | Onoda | ............. | H04L 29/12009 713/162 |
| 7,568,048 B2 * | 7/2009 | Murakami | ......... | H04L 61/2007 370/397 |
| 7,761,539 B2 * | 7/2010 | Izutani | ............. | H04L 29/12009 709/220 |
| 8,862,538 B2 * | 10/2014 | Patil | ............. | G06F 9/4856 707/607 |

(Continued)

FOREIGN PATENT DOCUMENTS

JP  2007-316678 A  12/2007

*Primary Examiner* — Moustafa M Meky
(74) *Attorney, Agent, or Firm* — Scully, Scott, Murphy & Presser, PC

(57) ABSTRACT

A communication system includes: a client device and a server. The server can store first address information specifying at least one first global IP address and is configured to: receive, from the client device, an IP packet containing first information and a second global IP address; determine whether the second global IP address coincides with the specified first global IP address; and when the second global IP address coincides with the specified first global IP address, transmit second information to the client device. The client device stores an object program and is configured to: transmit the first information to the server when the client device is in a restricted state in which the client device is not permitted to execute the object program; receive the second information from the server; and cancel the restricted state of the client device when the second controller receives the second information.

20 Claims, 11 Drawing Sheets

(56) References Cited

U.S. PATENT DOCUMENTS

| | | | |
|---|---|---|---|
| 8,874,911 B2* | 10/2014 | Kudo | H04L 29/12452 380/277 |
| 9,294,435 B2* | 3/2016 | Ivanov | H04L 61/1511 |
| 2003/0149898 A1* | 8/2003 | Onoda | H04L 29/12009 709/228 |
| 2007/0201479 A1* | 8/2007 | Ishiyama | H04L 12/2856 370/392 |
| 2007/0256118 A1 | 11/2007 | Nomura et al. | |
| 2008/0059615 A1* | 3/2008 | Izutani | H04L 29/12009 709/222 |
| 2014/0317313 A1* | 10/2014 | Okita | H04L 41/12 709/245 |

* cited by examiner

FIG.3A

| OBJECT PROGRAM | ALTERNATIVE PROGRAM |
|---|---|
| PROGRAM A-1 | — |
| PROGRAM B-1 | PROGRAM B-2 |
| PROGRAM C-1 | PROGRAM C-2 |
| ⋮ | ⋮ |

FIG.3B

| SPECIFIC PROGRAM |
|---|
| PROGRAM X |
| PROGRAM Y |
| ⋮ |

FIG.3C

| RELAY DEVICE ID | URL |
|---|---|
| RELAY DEVICE α | www.relay-α.jp |
| RELAY DEVICE β | www.relay-β.com |
| ⋮ | ⋮ |

FIG.3D

| RELAY DEVICE ID | TOKEN INFORMATION |
|---|---|
|  |  |

FIG.4A

| PROGRAM ID | PERMISSION RANGE INFORMATION |
|---|---|
| PROGRAM A-1 | 10.0.0.0 ~ 19.255.255.255 |
| PROGRAM B-1 | 20.0.0.0 ~ 29.255.255.255 |
| PROGRAM C-1 | 15.0.0.0 ~ 24.255.255.255 |
| ⋮ | ⋮ |

FIG.4B

| RELAY DEVICE ID | SUPPORT RANGE INFORMATION |
|---|---|
| RELAY DEVICE α | 10.0.0.0 ~ 14.255.255.255 |
| RELAY DEVICE β | 15.0.0.0 ~ 19.255.255.255 |

FIG.5B  | SUPPORT RANGE INFORMATION | 10.0.0.0 ~ 14.255.255.255 |

| PIN |
|---|
| 1234 |
| 7890 |
| ⋮ |

| DEVICE ID | TOKEN INFORMATION |
|---|---|
|  |  |

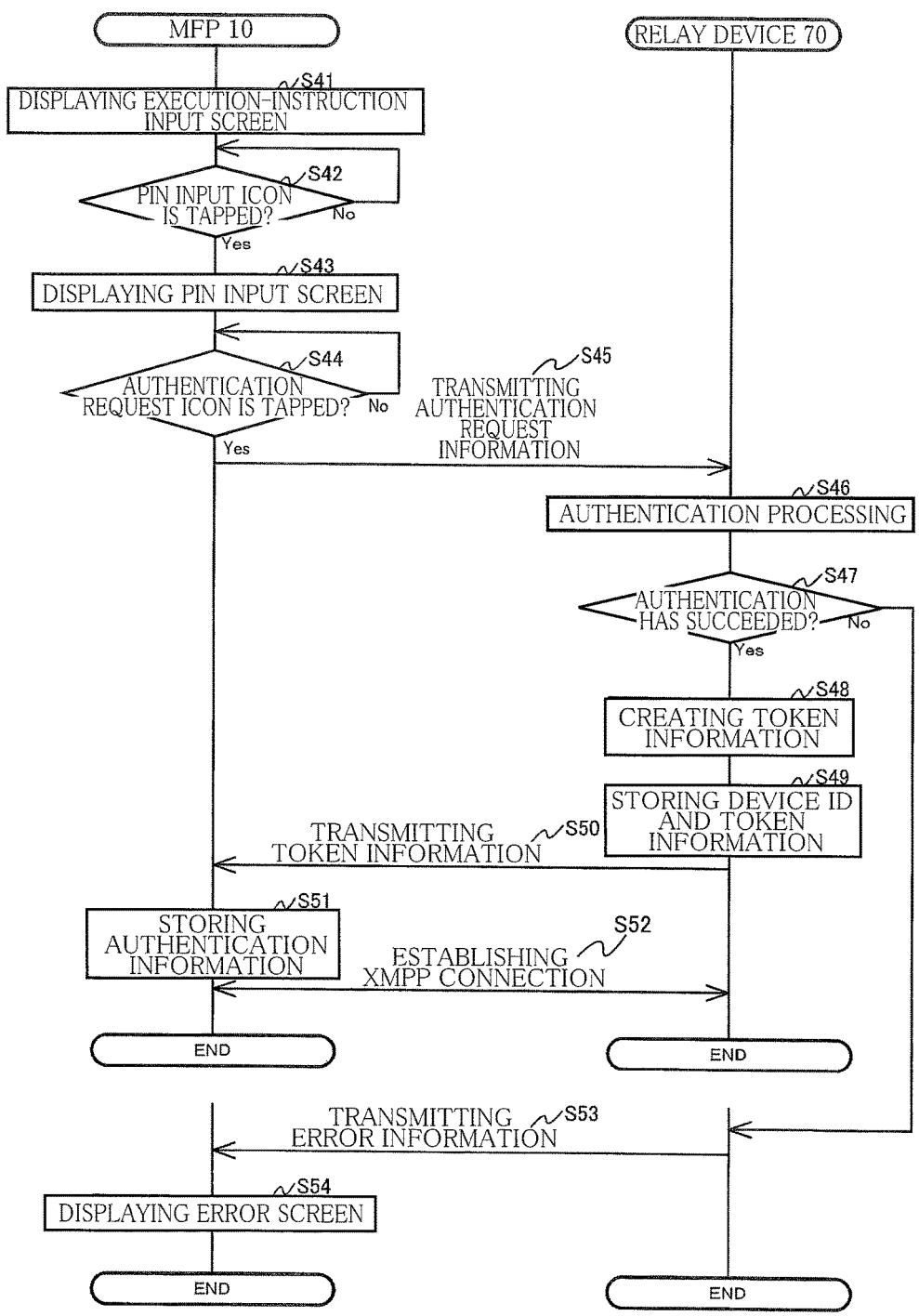

COMMUNICATION SYSTEM, SERVER, AND CLIENT DEVICE

CROSS REFERENCE TO RELATED APPLICATION

The present application claims priority from Japanese Patent Application No. 2014-129000, which was filed on Jun. 24, 2014, the disclosure of which is herein incorporated by reference in its entirety.

BACKGROUND

1. Technical Field

The following disclosure relates to: a communication system configured to control execution of a program in a client device; a server; and the client device.

2. Description of the Related Art

Various programs have been installed on recent information processing devices including image recording apparatuses. A controller of the information processing device executes the program to perform a function of the device.

SUMMARY

The programs to be executed by the information processing device are preferably optimized in accordance with, e.g., laws in a region in which the information processing device is placed, or conditions of infrastructure and user support (hereinafter referred to as "situation of device-placed region"). However, increase in kinds of the information processing devices results in complicated management. That is, from the viewpoint of managing the products, the same programs are preferably installed on all the information processing devices.

Accordingly, an aspect of the disclosure relates to: a communication system capable of determining whether a client device is permitted to execute an object program or not for each region in which the client device is placed; a server; and the client device.

In one aspect of the disclosure, a communication system includes a client device and a server. The server includes: a first communication device configured to be electrically connected with the client device in a method which complies with an IP protocol; a first storage storing first address information specifying at least one first global IP address; and a first controller. The first controller is configured to execute: a first reception process for receiving an IP packet from the client device via the first communication device, the IP packet containing first information, a second global IP address being set in the received IP packet; a determination process for determining whether the second global IP address set in the received IP packet coincides with one of the at least one first global IP address specified by the first address information; and a second information transmission process for transmitting second information to the client device via the first communication device, when the first controller determines in the determination process that the second global IP address coincides with one of the at least one first global IP address. The client device includes: a second communication device configured to be electrically connected with the server connected to the Internet, in a method which complies with the IP protocol; a program storage configured to store an object program; and a second controller. The second controller is configured to execute: a first information transmission process for transmitting the first information to the server via the second communication device when the client device is in a restricted state in which the client device is not permitted to execute the object program; a second reception process for receiving the second information from the server via the second communication device; and a restriction cancellation process for canceling the restricted state of the client device, when the second controller receives the second information in the second reception process.

In another aspect of the disclosure, a server includes: a communication device configured to be electrically connected with a client device in a method which complies with an IP protocol; a storage storing first address information specifying at least one first global IP address; and a controller. The controller is configured to execute: a first reception process for receiving an IP packet from the client device via the communication device, the IP packet containing first information, a second global IP address being set in the received IP packet; a determination process for determining whether the second global IP address set in the received IP packet coincides with one of the at least one first global IP address specified by the first address information; and a notification process for transmitting second information to the client device via the communication device when the controller determines in the determination process that the second global IP address coincides with one of the at least one first global IP address, the second information being used for the client device to remove restriction on execution of the object program.

In another aspect of the disclosure, a client device includes: a communication device configured to be electrically connected with a server connected to the Internet, in a method which complies with an IP protocol; a program storage configured to store an object program; and a controller. The controller is configured to execute: a first information transmission process for transmitting first information to the server via the communication device when the client device is in a restricted state in which the client device is not permitted to execute the object program; a second reception process for receiving second information from the server via the communication device; and a restriction cancellation process for canceling the restricted state of the client device when a second global IP address for the client device coincides with at least one first global IP address stored in the server and when the controller receives the second information in the second reception process.

In another aspect of the disclosure, a communication system includes: a client device; and a server. The server includes: a first communication device configured to be electrically connected with the client device in a method which complies with an IP protocol; a first storage storing first address information specifying at least one first global IP address; and a first controller. The first controller is configured to execute: a first reception process for receiving an IP packet from the client device via the first communication device, the IP packet containing first information, a second global IP address being set in the received IP packet; a determination process for determining whether the second global IP address set in the received IP packet coincides with one of the at least one first global IP address specified by the first address information; a second information transmission process for transmitting second information to the client device via the first communication device when the first controller determines in the determination process that the second global IP address coincides with one of the at least one first global IP address; and a third information transmission process for transmitting third information to the client device via the first communication device when the first controller determines in the determination process that the second global IP address does not coincide with the at least one first global IP address. The client device includes: a second communication device configured to be electrically connected with the server connected to the Internet, in a method which complies with the IP protocol; and a second controller. The second controller is configured to execute: a first information transmission process for transmitting the first information to the server via the second communication device; a second reception process for receiving the second information from the server via the second communication device; a first setting process for establishing a setting in which the client device is permitted to execute a first process, when the second controller receives the second information in the second reception process; a third reception process for receiving the third information from the server via the second communication device; and a second setting process for establishing a setting in which the client device is permitted to execute a second process, when the second controller receives the third information in the second reception process.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIGS. 3A-3D are tables illustrating examples of programs and information stored in a storage device of the MFP, wherein FIGS. 3A and 3B illustrate a program storage, FIG. 3C illustrates a URL storage, and FIG. 3D illustrates an authentication information storage;

FIGS. 4A and 4B are tables illustrating examples of information stored in a storage device of the server device, wherein FIG. 4A illustrates a relationship between program IDs and permission range information, and FIG. 4B illustrates a relationship between relay device IDs and support range information;

FIG. 5A is a block diagram illustrating a relay device, and FIGS. 5B-5D are tables illustrating examples of information stored in a storage device of the relay device, wherein FIG. 5B illustrates support range information set for the relay device, FIG. 5C illustrates a user identification information storage, and FIG. 5D illustrates a client identification information storage;

FIG. 9 is a flow chart illustrating processings which are executed between the MFP and the relay device;

FIGS. 10A and 10B are views illustrating examples of screens displayed on the display device of the MFP, wherein FIG. 10A illustrates a menu screen, and FIG. 10B illustrates an execution-instruction input screen displayed in the case where execution of a program A-1 is permitted; and FIGS. 11A and 11B are views illustrating examples of screens displayed on the display device of the MFP, wherein FIG. 11A illustrates an execution-instruction input screen displayed in the case where the execution of the program A-1 is not permitted, and FIG. 11B illustrates a PIN input screen.

DETAILED DESCRIPTION OF THE EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure.

Figure 1:
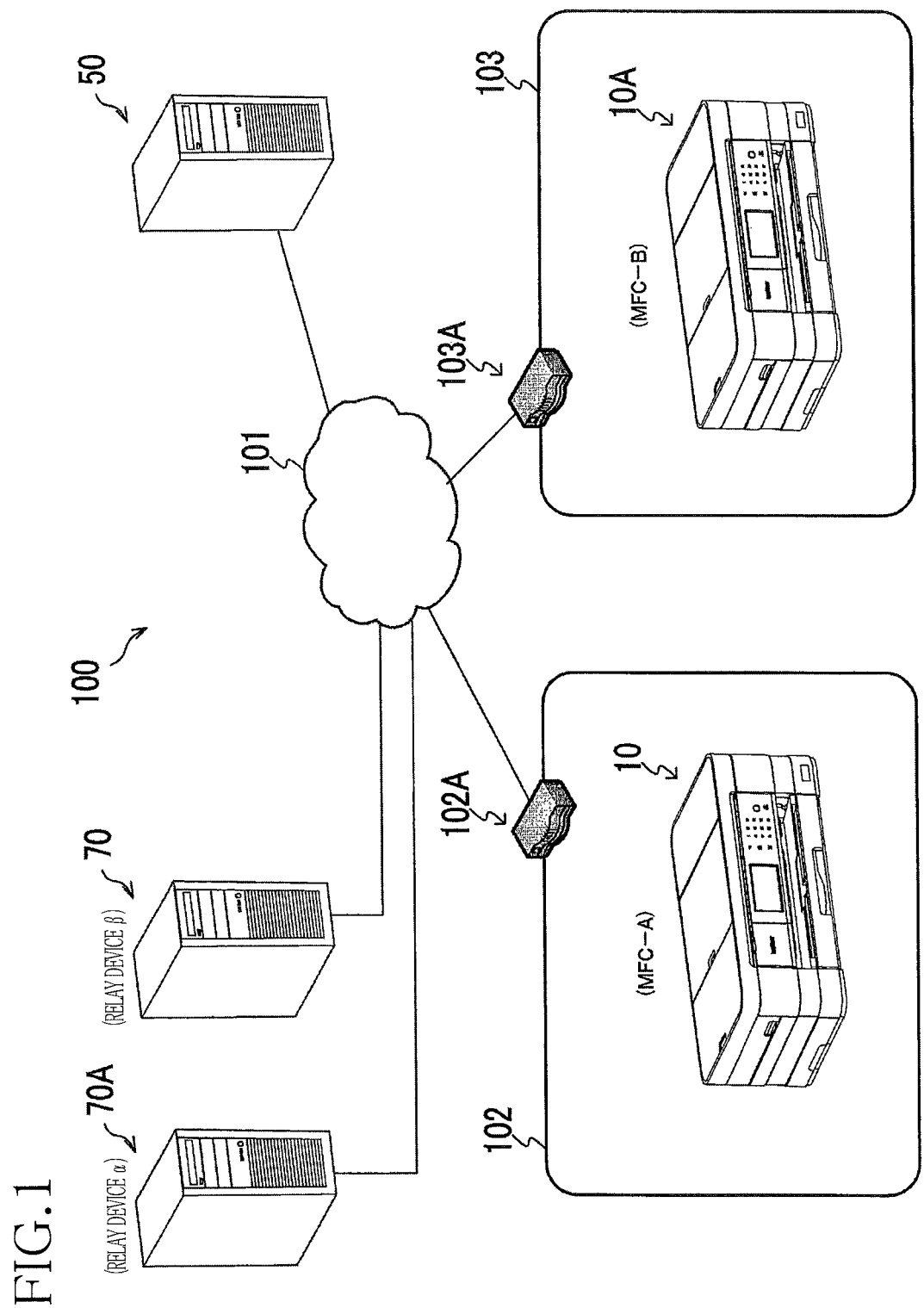
FIG. 1 is a schematic view illustrating a communication system according to one embodiment.

FIG. 1 illustrates a communication system 100 according to the present embodiment. As illustrated in FIG. 1, the communication system 100 includes at least one multi-function peripheral (MFP), a server device 50, and at least one relay device. In the present embodiment, the at least one MFP includes MFPs 10, 10A, and the at least one relay device includes relay devices 70, 70A. The MFPs 10, 10A, the server device 50, and the relay devices 70, 70A are communicable with each other over a communication network. Any network may be used as the communication network. In the present embodiment, the communication network is constituted by the Internet 101 and Local Area Networks (LANs) 102, 103 connected to the Internet 101.

In the example in FIG. 1, the LANs 102, 103 are connected to the Internet 101 respectively via, e.g., routers 102A, 103A. The MFP 10 is on the LAN 102, and the MFP 10A is on the LAN 103. The server device 50 and the relay devices 70, 70A are connected to the Internet 101. It is noted that the description "the device is on the LAN 102" indicates that the device is set for connection to the LAN 102 so as to be allowed to communicate with other devices placed on the LAN 102, more specifically, the device is given a network address that is assigned to the LAN 102, for example.

The routers 102A, 103A serve as firewalls. That is, when a request is transmitted from the MFP 10 to the server device 50 or any of the relay devices 70, 70A and when a response is transmitted from the server device 50 or any of the relay devices 70, 70A to the MFP 10, the router allows these request and response to pass through it. When a request is transmitted from the server device 50 or any of the relay devices 70, 70A to the MFP 10, on the other hand, the router inhibits the request from passing through it.

MFP 10

Figure 2A:
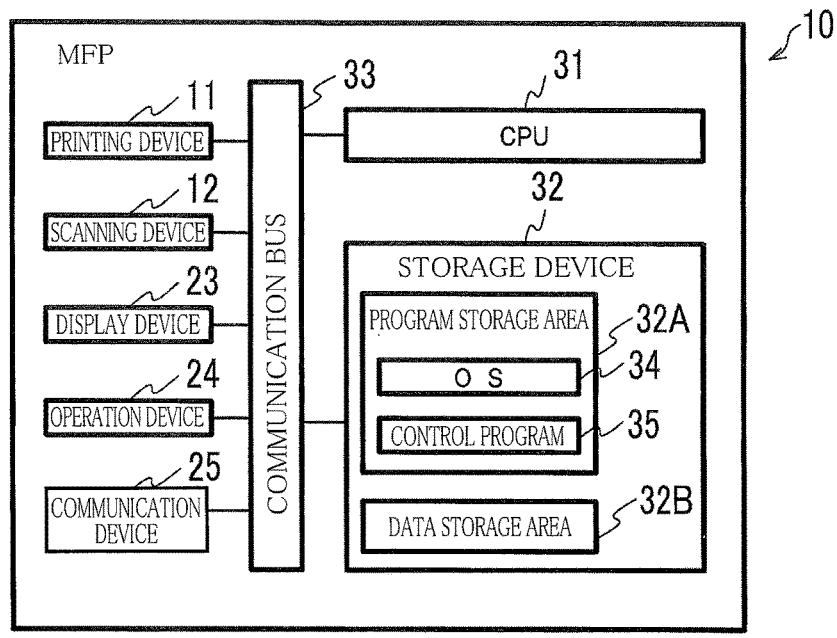
FIG. 2A is a block diagram illustrating a multi-function peripheral (MFP)

As illustrated in FIG. 2A, the MFP 10 includes a printing device 11, a scanning device 12, a display device 23, an operation device 24, a communication device 25, a central processing unit (CPU) 31, a storage device 32, and a communication bus 33. The devices of the MFP 10 are connected to each other by the communication bus 33. The MFP 10 is one example of a client device or an image recording apparatus. Any device may be used as the client device, examples of which include: specialized machines such as a printer, a label printer, a scanner, a facsimile machine, a sewing machine, and a machine tool; mobile terminals such as a smartphone, a mobile phone, and a tablet computer; and a personal computer (PC). The MFPs 10, 10A have the same configuration, and a detailed explanation will be given for only the MFP 10 for simplicity unless otherwise required by context.

Printing Device 11 and Scanning Device 12

The printing device 11 records an image on a recording sheet based on image data. The printing device 11 may be a well-known printing device such as an ink-jet printing device or an electronic photographic printing device. The scanning device 12 performs a scanning operation for creating image data by reading an image recorded on a recording sheet. The MFP 10 may further have other functions including: a facsimile function for transmitting and receiving facsimiles; and a copying function for reading an image recorded on a recording sheet and recording the image on another recording sheet.

Display Device 23

The display device 23 includes a display screen for displaying various kinds of information thereon. The display device 23 may be constituted by any device such as a liquid crystal display (LCD) and an organic electroluminescent display (OELD).

Operation Device 24

The operation device 24 receives or accepts a user operation for selecting an object displayed on the display screen of the display device 23. Specifically, the operation device 24 includes push buttons, for example, and sends the CPU 31 a signal corresponding to a pushed one of the push buttons. The operation device 24 may further include a touch sensor shaped like a thin layer superposed on the display screen of the display device 23. That is, the display device 23 may be constituted as a touch panel display. The touch sensor may be constituted by a well-known sensor such as a capacitance sensor and a resistive film sensor.

It is noted that the object is an image selectable by the user operating the operation device 24. For example, the MFP 10 may be configured such that each of objects is a character string displayed on the display device 23, one of the displayed objects is highlighted by a push of a direction key of the operation device 24, and the highlighted object is selected by a push of a determination button of the operation device 24. As another example, in the case where the operation device 24 is a touch panel, the object may be an icon, a button, or a link displayed on the display device 23, for example, and the user may touch the object to select it.

Communication Device 25

The communication device 25 is an interface for communicating with external devices over a communication network. In the present embodiment, the communication device 25 communicates with the external devices according to the IP (internet protocol) protocol. That is, the MFP 10 outputs various kinds of information to the server device 50 or the relay devices 70, 70A via the communication device 25 and receives various kinds of data or information from the server device 50 or the relay devices 70, 70A via the communication device 25.

CPU 31

The CPU 31 controls operations of the MFP 10. The CPU 31 acquires various programs (which will be described below) from the storage device 32 and executes them, based on information output from the operation device 24 and information acquired from the external device via the communication device 25. In view of the above, the CPU 31 and the storage device 32 are one example of a controller.

Storage Device 32

The storage device 32 includes a program storage area 32A and a data storage area 32B. The program storage area 32A stores an operating system (OS) 34 and a control program 35. It is noted that the control program 35 may be a single program and may be a collection of a plurality of programs. The data storage area 32B stores data and/or information required for execution of the control program 35. The storage device 32 stores, for example, various programs and various kinds of information illustrated in FIGS. 3A-3D. In the present embodiment, the programs and information illustrated in FIGS. 3A-3C have already been stored at the time of shipping of the MFP 10, and no specific information is not stored in a storage area illustrated in FIG. 3D at the time of shipping of the MFP 10.

In the present specification, the term "data" and the term "information" are the same in that each of them is a bit or a bit string which can be handled by a computer. The data can be handled by the computer regardless of details indicated by each bit. The information causes branching in an operation of the computer depending on details indicated by each bit. Moreover, the term "instruction" is a control signal for demanding next operation to a device to which the instruction is transmitted, and may include the information or may have a nature of the information.

Also, even if the data and the information are changed in format (e.g., a text format, a binary format, and a flag format) for each computer, the computer treats the data before the change and the data after the change as the same data as long as the computer recognizes that the data before the change and the data after the change are substantially the same as each other. For example, information indicating "two" may be stored in one computer as information in a text format of "0x32" in the ASCII code and stored in another computer as information in a binary format of "10" as a binary number.

In the present specification, data and information before predetermined calculation performed thereto may be treated respectively as data and information after the calculation. It is assumed that key information not encrypted is stored in the storage device, and encrypted key information is received via the communication device 25, for example. In this situation, in the case where the key information stored in the storage device coincides with decrypted key information that is obtained by decrypting the encrypted key information, the key information, the encrypted key information, and the decrypted key information may be treated as the same key information. It is noted that the predetermined calculation is not limited to encryption and decryption and may be calculation such as a hush function.

However, the data and the information are not strictly distinguished and may be treated exceptionally. For example, the data may be temporarily treated as the information, and the information may be temporarily treated as the data. Also, the data treated in one device may be treated as the information in another device, and vice versa. Furthermore, the information may be taken out from the data, and the data from the information.

The storage device 32 is, for example, constituted by a random access memory (RAM), a read only memory (ROM), an electrically erasable programmable read-only memory (EEPROM), a hard disk drive (HDD), a buffer for the CPU 31, and other similar devices, or constituted by a combination of at least two of these devices.

The storage device 32 may be a storage medium readable by a computer. The storage medium readable by a computer is a non-transitory medium. Examples of the non-transitory medium also include recording media such as a CD-ROM and a DVD-ROM. The non-transitory medium is also a tangible medium. However, an electrical signal for transmitting programs downloaded from, e.g., a server on the Internet is a signal medium readable by the computer as one kind of a medium readable by the computer but is not a non-transitory storage medium readable by the computer.

Programs stored in the program storage area 32A are executed by the CPU 31. However, in the present specification, an operation of each of the programs may be described without referring to the CPU 31. That is, the description meaning that "a program A executes a processing A" may indicate that "the CPU 31 executes the processing A written in the program A". This applies to the server device 50 and the relay devices 70, 70A which will be described below.

The OS 34 is a basic program which provides an application programming interface (API) for controlling hardware constituting the MFP 10 such as the printing device 11, the scanning device 12, the display device 23, the operation device 24, and the communication device 25. That is, each of the above-mentioned programs controls the hardware by calling up the API provided by the OS 34. However, in the present specification, operations of the programs will be described without referring to the OS 34. That is, the description described later meaning that "program B controls hardware C" may indicate that "the program B controls the hardware C through the API of the OS 34". This applies to the server device 50 and the relay devices 70, 70A which will be described below.

As illustrated in FIG. 3A, the program storage area 32A stores object programs and alternative programs in a state in which each of the alternative programs is associated with a corresponding one of the object programs. The program storage area 32A storing the object programs and the alternative programs is one example of a program storage. Each of the object programs and the alternative programs may be executed by the CPU 31 of the MFP 10. The object programs and the alternative programs are not executable at the time of shipping of the MFP 10, but permission provided by the server device 50 allows execution of the object programs and the alternative programs. Any functions may be achieved by the programs, and examples of the functions are, for example, as follows.

A program A-1 is executed for acquisition of token information from the relay devices 70, 70A, for example. A detailed explanation for processings executed according to the program A-1 will be explained later with reference to FIG. 9. It is noted that no alternative program is associated with the program A-1 in the present embodiment. That is, in the case where the MFP 10 cannot acquire permission for execution of the program A-1 from the server device 50, the MFP 10 cannot acquire the token information from the relay devices 70, 70A.

Each of a program B-1 and a program B-2 may be a recording control program which causes the printing device 11 to perform a recording operation, for example. The program B-1 may be optimized for recording of a high-quality image on a recommended sheet having a predetermined quality. The program B-2 may be set for allowing the printing device 11 to perform a recording operation such that an image that is lower in image quality than that created according to the program B-1 is recordable also on a recording sheet that is lower in quality than the recommended sheet.

Each of a program C-1 and a program C-2 may be a power control program for controlling electric power supplied to the MFP 10, for example. The program C-1 may be a program which achieves high energy-saving performance in the case where the MFP 10 is used within a predetermined range of temperatures. The program C-2 may be optimized for use of the MFP 10 in a cold climate area, although energy-saving performance achieved by the program C-2 is lower than that achieved by the program C-1.

As thus described, the functions achieved by the object program and the alternative program associated with each other are basically the same but different in details. For example, the object program may be a program obtained by expanding the function achieved by the alternative program. In other words, the alternative program may achieve a function which is an alternative to a portion of the function achieved by the object program. Alternatively, the object program and the alternative program may be optimized for different conditions, respectively. The MFP 10 may execute one of the object program and the alternative program based on information acquired from the server device 50.

As illustrated in FIG. 3B, the program storage area 32A stores specific programs. The program storage area 32A storing the specific programs is another example of the program storage. The specific program is a program for use of a specific service provided by a specific service providing device authorized in advance. Any device may be used as the specific service providing device, one example of which is a device configured to provide services such as Dropbox (registered trademark), GoogleDocs (registered trademark), and Evernote (registered trademark).

As illustrated in FIG. 3C, the data storage area 32B stores (i) relay device IDs identifying the respective relay devices 70, 70A uniquely and (ii) uniform resource locators (URLs) indicating the locations of the respective relay devices 70, 70A such that each of the relay device IDs and a corresponding one of the URLs are associated with each other. The storage device 32 storing the relay devices ID and the URLs associated with each other is one example of a URL storage. The relay device ID is one example of authentication-device identification information.

As illustrated in FIG. 3D, the data storage area 32B can store one of the relay device IDs and token information acquired from the relay device identified by the relay device ID in a state in which the relay device ID and the token information are associated with each other. The storage device 32 storing the relay device ID and the token information associated with each other is one example of an authentication information storage. The token information is one example of authentication information.

Server Device 50

Figure 2B:
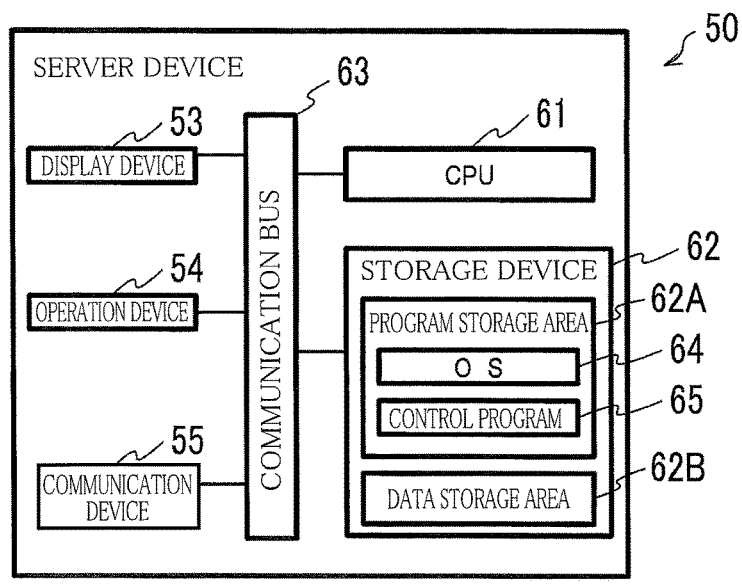
FIG. 2B is a block diagram illustrating a server device.

As illustrated in FIG. 2B, the server device 50 includes a display device 53, an operation device 54, a communication device 55, a CPU 61, a storage device 62 (as one example of a first storage), and a communication bus 63. Each of the display device 53, the operation device 54, the communication device 55, the CPU 61, the storage device 62, and the communication bus 63 of the server device 50 has the same structure as that of a corresponding one of the display device 23, the operation device 24, the communication device 25, the CPU 31, the storage device 32, and the communication bus 33 of the MFP 10, and an explanation of which is dispensed with. The CPU 61 and the storage device 62 are one example of a controller.

As illustrated in FIG. 4A, a data storage area 62B of the storage device 62 stores (i) program IDs respectively identifying the object programs uniquely and (ii) plural sets of permission range information (as one example of first address information) respectively indicating ranges of global IP addresses (each as one example of first global IP addresses) in a state in which each of the program IDs is associated with a corresponding one of the sets of permission range information. The permission range information is, in other words, information indicating a relationship between each object program and a region in which execution of the object program is permitted. The same permission range information may be associated with different program IDs in the present embodiment. For example, the server device 50 may acquire a pair of the program ID and the permission range information from an administrator via the display device 53 and the operation device 54 or from an external device via the communication device 55. The program ID is one example of program identification information.

As illustrated in FIG. 4B, the data storage area 62B further stores the relay device IDs and plural sets of support range information (each as one example of second address information) respectively indicating ranges of the global IP addresses (each as one example of third global IP address) in a state in which each of the relay device IDs is associates with a corresponding one of the sets of the support range information. The support range information is, in other words, information indicating a relationship between each relay device and a region supported by the relay device. The support range information indicates a range of IP addresses of devices which transmits authentication request information for execution of an authentication processing which will be described below. The same support range information is not associated with different relay device IDs in the present embodiment.

For example, the server device 50 may acquire a pair of the relay device ID and the support range information from the administrator via the display device 53 and the operation device 54 or from an external device via the communication device 55. As one example, the server device 50 may receive the support range information associated with the relay device ID, from the relay device identified by the relay device ID, via the communication device 55. This processing is executed by the CPU 61 according to a control program 65, for example. This processing is one example of a second address information reception process.

As described above, each region is assigned with a predetermined range of the global IP addresses. For example, a region A is assigned with global IP addresses ranging from 10.0.0.0 to 14.255.255.255, a region B with global IP addresses ranging from 15.0.0.0 to 19.255.255.255, a region C with global IP addresses ranging from 20.0.0.0 to 24.255.255.255, and a region D with global IP addresses ranging from 25.0.0.0 to 29.255.255.255.

Each of the sets of the permission range information illustrated in FIG. 4A indicates whether a corresponding program is permitted to be executed by the client devices placed in a corresponding region. That is, FIG. 4A illustrates that the client devices placed in the regions A, B are permitted to execute the program A-1, the client devices placed in the regions C, D are permitted to execute the program B-1, and the client devices placed in the regions B, C are permitted to execute the program C-1. As thus described, one set of permission range information may contain a range of the global IP addresses assigned to a plurality of regions. Likewise, a range of the global IP addresses assigned to one region may be contained in plural sets of the permission range information.

The support range information illustrated in FIG. 4B is information obtained by further dividing the permission range information corresponding to the program A-1 illustrated in FIG. 4A. That is, FIG. 4B indicates that the client devices placed in the region A are supported by the relay device 70A identified as a relay device α, and the client devices placed in the region B are supported by the relay device 70 identified as a relay device β, among the client devices permitted to execute the program A-1.

Relay Device 70

Figures 5A, 5C, 5D:
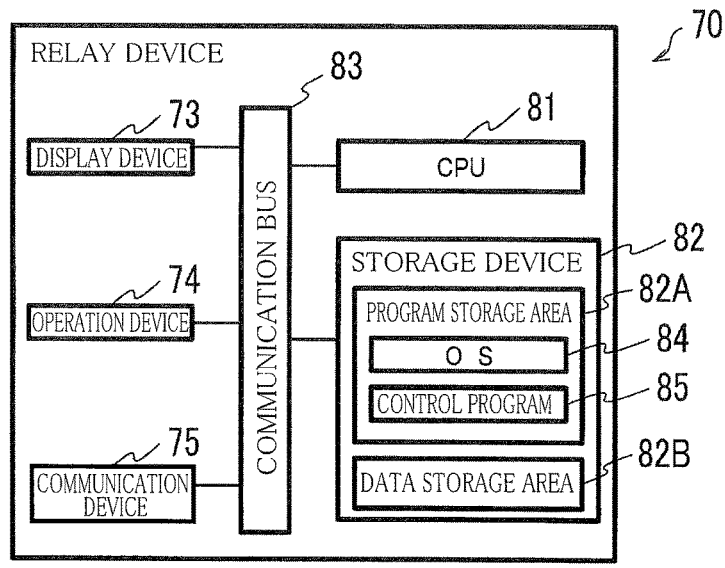

As illustrated in FIG. 5A, the relay device 70 includes a display device 73, an operation device 74, a communication device 75, a CPU 81, a storage device 82, and a communication bus 83. Each of the display device 73, the operation device 74, the communication device 75, the CPU 81, the storage device 82, and the communication bus 83 of the relay device 70 has the same structure as that of a corresponding one of the display device 23, the operation device 24, the communication device 25, the CPU 31, the storage device 32, and the communication bus 33 of the MFP 10, and an explanation of which is dispensed with. The CPU 81 and the storage device 82 are one example of a controller. Each of the relay devices 70, 70A is one example of an authentication device. The relay devices 70, 70A have the same configuration, and a detailed explanation will be given for only the relay device 70 for simplicity unless otherwise required by context.

As illustrated in FIG. 5B, a data storage area 82B of the storage device 82 stores the support range information assigned to the relay device 70. For example, the relay device 70 may accept new registration or change of the support range information from an administrator via the display device 73 and the operation device 74 or from an external device via the communication device 75. Upon the new registration or change of the support range information, the relay device 70 may transmit the support range information to the server device 50 via the communication device 75.

As illustrated in FIG. 5C, the data storage area 82B further stores personal identification numbers (PINs). The storage device 82 storing the PINs is one example of a user identification information storage. The relay device 70 can store the PIN into the data storage area 82B in a procedure described below, for example.

The relay device 70 stores pairs of user IDs and passwords for respective users of the MFP 10 in advance. The relay device 70 creates a PIN upon receiving a pair of the user ID and the password from an external device via the communication device 75. Any method may be used to create the PIN, for example, random numbers may be used. The relay device 70 stores the created PIN into the data storage area 82B illustrated in FIG. 5C and transmits the PIN to the external device via the communication device 75. In these processings, the user of the MFP 10 inputs the user ID and the password into the external device to cause the external device to transmit the user ID and the password to the relay device 70, and the user then recognizes the PIN displayed on a display device of the external device.

As illustrated in FIG. 5D, the data storage area 82B can store (i) a device ID identifying the MFP 10 uniquely and (ii) the token information in a state in which the device ID and the token information are associated with each other. A pair of the device ID and the token information are stored into the data storage area 82B in a processing which will be described below with reference to FIG. 9. The storage device 82 storing the device ID and the token information associated with each other is one example of a client identification information storage. The device ID is one example of client identification information.

Operations in Communication System 100

Figure 6:
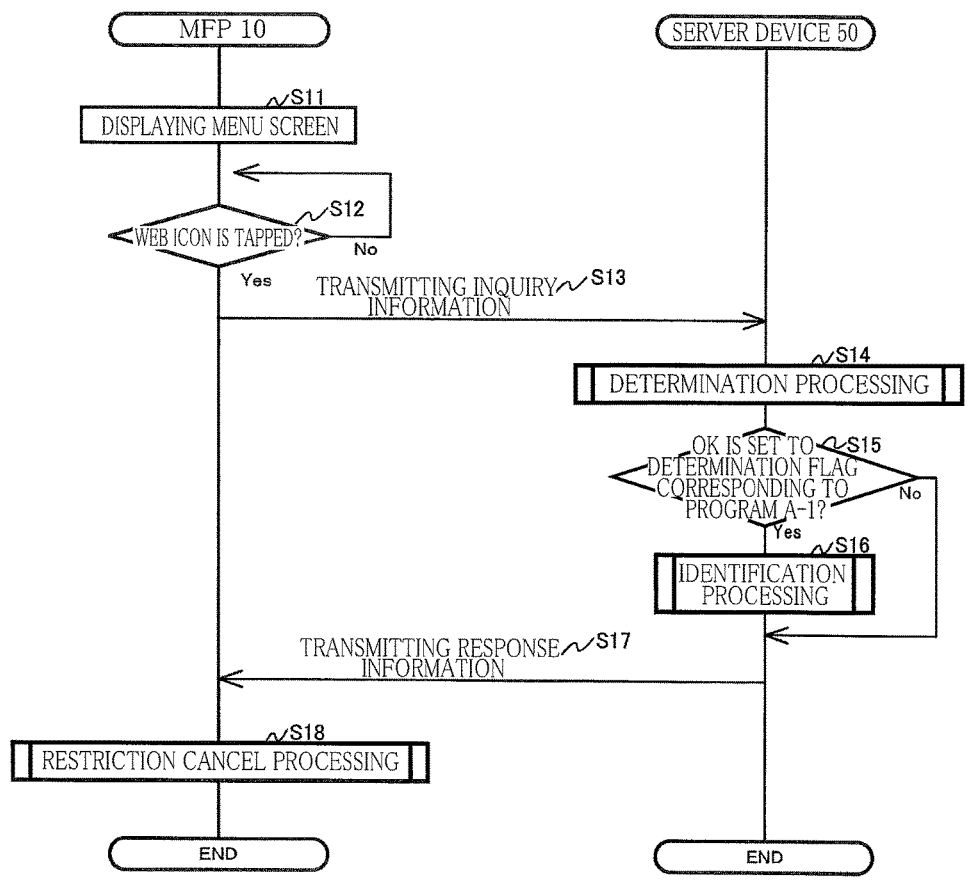
FIG. 6 is a flow chart illustrating processings which are executed between the MFP and the server device.
Figure 7A:
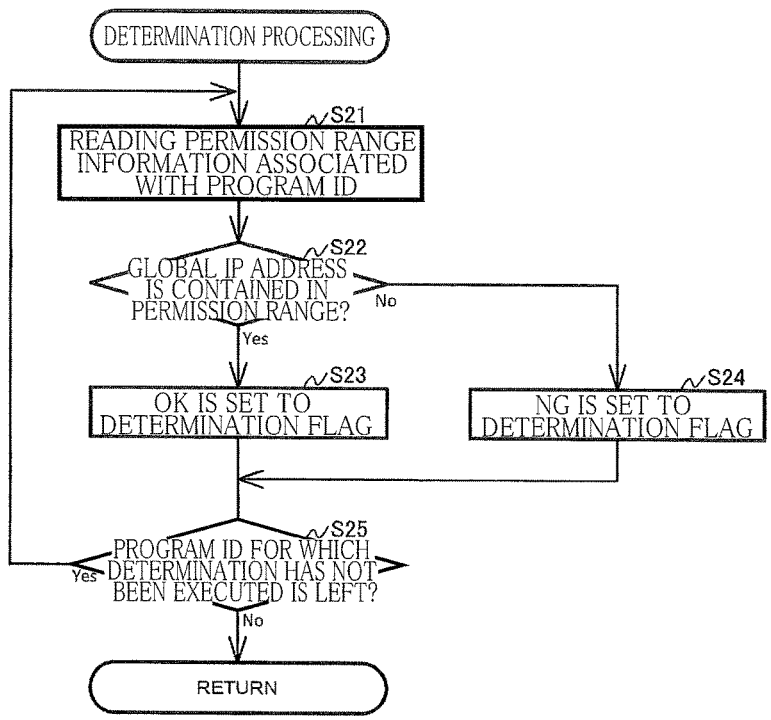
FIG. 7A is a flow chart illustrating a determination processing which is executed by the server device.
Figure 7B:
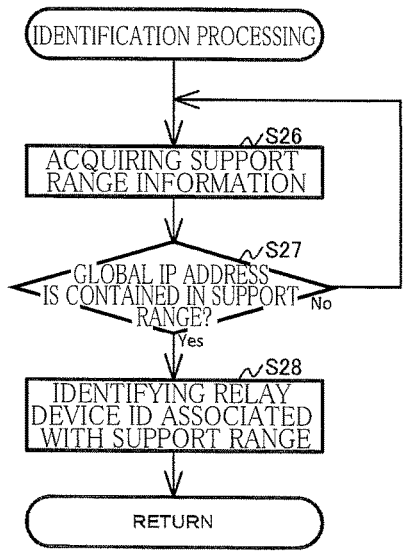
FIG. 7B is a flow chart illustrating an identification processing which is executed by the server device.
Figure 8:
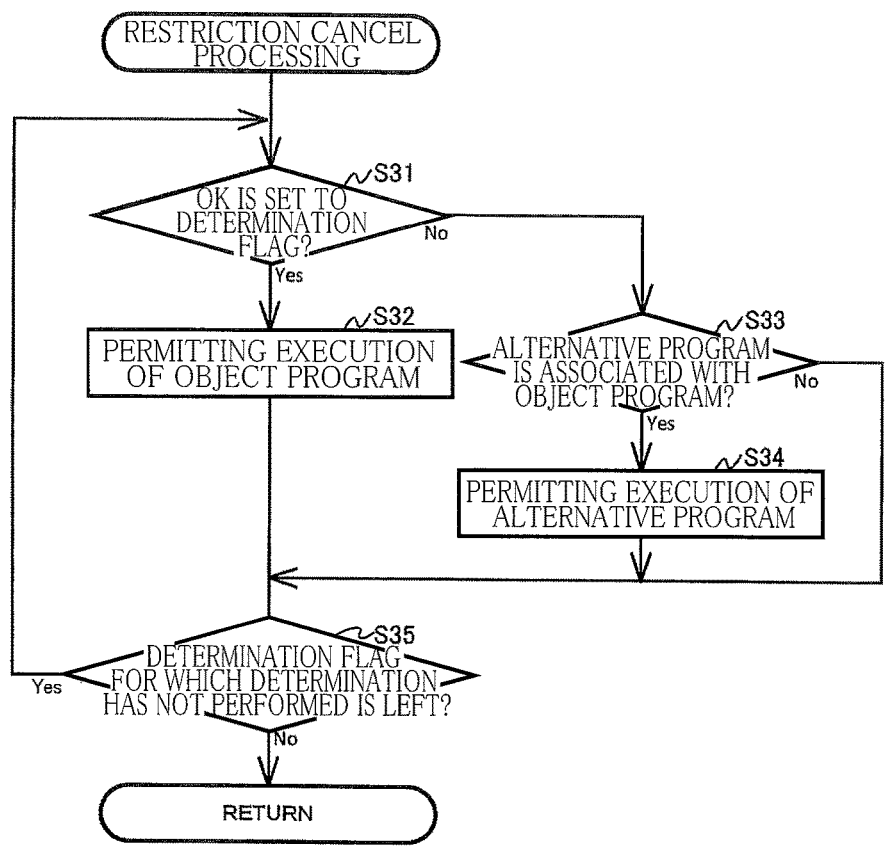
FIG. 8 is a flow chart illustrating a restriction removal processing which is executed by the MFP.

There will be next explained operations and processings in the communication system 100 with reference to FIGS. 6-11. FIG. 6 is a flow chart illustrating a flow in which the MFP 10 inquires of the server device 50 whether or not the MFP 10 is permitted to execute the object program stored in the program storage area 32A. In the present embodiment, it is assumed that the router 102A is assigned with the global IP address "18.5.3.110". That is, the MFP 10 is placed in the region B described above.

Figure 10A:
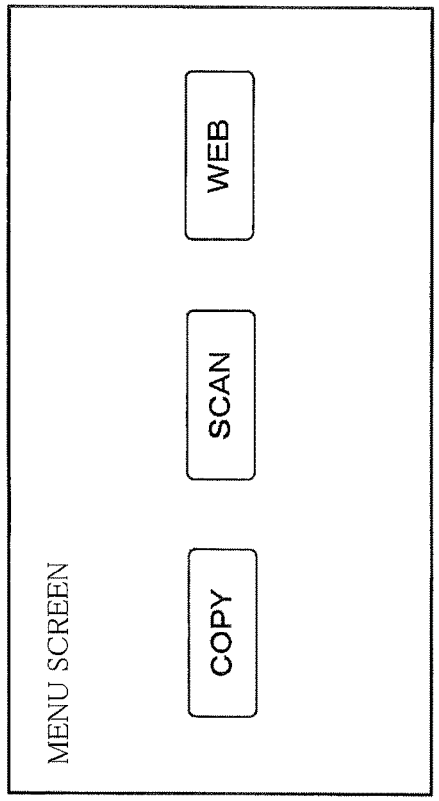

The flow illustrated in FIG. 6 begins with S11 at which the control program 35 of the MFP 10 displays a menu screen on the display device 23. FIG. 10A illustrates one example of the menu screen. As illustrated in FIG. 10A, the menu screen contains a COPY icon, a SCAN icon, and a WEB icon. The COPY icon is for receiving a user instruction of causing the printing device 11 and the scanning device 12 to perform a copy operation. The SCAN icon is for receiving a user instruction of causing the scanning device 12 to perform a scan operation. The WEB icon is for receiving a user instruction of causing the MFP 10 to inquire of the server device 50 whether or not the MFP 10 is permitted to execute the object program stored in the program storage area 32A, especially, the program A-1.

When the operation device 24 accepts a user operation of tapping on the WEB icon (S12: Yes), the control program 35 at S13 transmits inquiry information to the server device 50 via the communication device 25. The inquiry information is one example of first information, and the processing at S13 is one example of a first information transmission process. The data storage area 32B stores the URL of the server device 50 in advance. The control program 35 at S13 transmits the inquiry information via the communication device 25, for example, to the server device 50 indicated by the URL stored in the data storage area 32B. The storage device 32 storing the URL of the server device 50 is one example of an address storage, and URL is one example of location information indicating the location of the server device 50.

For example, the inquiry information is transmitted to inquire of the server device 50 whether or not the MFP 10 is permitted to execute the object program stored in the program storage area 32A or to inquire of the server device 50 whether or not a permission range contains the global IP address that is set in the IP packet containing the inquiry information. For example, the inquiry information contains at least one program ID identifying a corresponding object program for which the MFP 10 inquires of the server device 50 whether or not the MFP 10 is permitted to execute the object program. In the present embodiment, the inquiry information contains the program IDs respectively identifying the program A-1, the program B-1, and the program C-1.

It is noted that a local IP address is assigned to the MFP 10 in the LAN 102, and the local address at the transmission of the IP packet containing the inquiry information is set as an IP address of the device having transmitted the IP packet containing the inquiry information. Upon reception of the IP packet containing the inquiry information, the router 102A sets the global IP address "18.5.3.110" assigned to the router 102A, as the IP address of the device having transmitted the IP packet and transmits the global IP address to the server device 50. In the case where the MFP 10 is directly connected to the Internet 101, the global IP address assigned to the MFP 10 is set as the IP address of the device having transmitted the IP packet containing the inquiry information.

When the control program 65 of the server device 50 at S13 receives, via the communication device 55, the inquiry information transmitted by the MFP 10 and passed by the router 102A, the control program 65 at S14 executes a determination processing. In this determination processing, the control program 65 determines whether the global IP address that is set in the IP packet containing the inquiry information (noted that the global IP address hereinafter may be referred to as "object global IP address") is contained in the permission range or not. There will be next explained the determination processing in detail with reference to FIG. 7A.

The control program 65 at S21 reads the permission range information associated with one of the program IDs contained in the inquiry information, from the data storage area 62B illustrated in FIG. 4A. When the object global IP address is contained in the permission range indicated by the permission range information (S22: Yes), the control program 65 at S23 sets "OK" to the determination flag corresponding to the program ID. That is, the control program 65 sets "OK" to a determination flag when the object global IP address is contained in the range of the global IP addresses assigned to the region in which execution of the object program is permitted. When the object global IP address is not contained in the permission range indicated by the permission range information (S22: No), the control program 65 at S24 sets "NG" to the determination flag corresponding to the program ID.

Until determination is finished for all the program IDs contained in the inquiry information (S25: No), the control program 65 repeatedly executes the processings at S21-S25. Each time when this flow returns to S21, the execution is implemented for a different program ID as the key information for reading the permission range information. That is, in the determination processing, the control program 65 determines whether or not the global IP address is contained in the permission ranges corresponding to the plurality of program IDs contained in the inquiry information. In the present embodiment, "OK" is set to the determination flag corresponding to the program A-1, "NG" to the determination flag corresponding to the program B-1, and "OK" to the determination flag corresponding to the program C-1.

Returning to FIG. 6, when "OK" is set to the determination flag corresponding to the program A-1 (S15: Yes), the control program 65 at S16 executes an identification processing. When "NG" is set to the determination flag corresponding to the program A-1 (S15: No), this flow skips S16. In this identification processing, the control program 65 identifies, based on the object global IP address, the relay device to which the MFP 10 is to transmit the authentication request information which will be described below. There will be next explained the identification processing in detail with reference to FIG. 7B.

This flow begins with S26 at which the control program 65 reads one of the sets of the support range information illustrated in FIG. 4B from the data storage area 62B. When the object global IP address is contained in a support range indicated by the support range information (S27: Yes), the control program 65 at S28 identifies the relay device ID associated with the support range information. When the object global IP address is not contained in the support range indicated by the support range information (S27: No), this flow returns to S26. Each time when this flow returns to S26, different support information is read at S26. In the present embodiment, the control program 65 at S28 identifies the relay device ID "the relay device β".

Returning to FIG. 6 again, the control program 65 at S17 transmits response information to the MFP 10 via the communication device 55. The response information is one example of second information. This response information contains a response to the inquiry information. That is, the response information is transmitted to notify the MFP 10 about whether or not the MFP 10 is permitted to execute the object program or about whether the global IP address that is set in the IP packet containing the inquiry information is contained in the permission range or not.

The response information contains (i) the determination flag corresponding to each of the program IDs contained in the inquiry information and (ii) the relay device ID identified in the identification processing, for example. Instead of the determination flag, the response information may contain the program ID corresponding to the permission range information which is determined to contain the object global IP address. The processing in which the control program 65 transmits the response information containing the determination flag set to "OK" or the response information containing the program ID is one example of a second information transmission process. The processing in which the control program 65 transmits the response information containing the determination flag set to "NG" is one example of a third information transmission process. The response information containing the determination flag set to "NG" is one example of third information.

Upon reception of the response information from the server device 50 via the communication device 25 (S17), the control program 35 of the MFP 10 at S18 executes a restriction removal processing. In this restriction removal processing, the control program 35 permits the MFP 10 to execute the object program or the alternative program based on the determination flag contained in the response information received from the server device 50. There will be next explained the restriction removal processing in detail with reference to FIG. 8.

When "OK" is set to the determination flag contained in the response information (S31: Yes), the control program 35 at S32 permits execution of the object program identified by the program ID corresponding to the determination flag. When "NG" is set to the determination flag (S31: No), the control program 35 at S33 determines whether or not the alternative program is associated with the object program identified by the program ID corresponding to the determination flag. When the alternative program is associated with the object program (S33: Yes), the control program 35 at S34 permits execution of the alternative program. When the alternative program is not associated with the object program (S33: No), this flow skips S34.

When the determination flag or flags for which the processing at S31 has not been executed are left (S35: Yes), this flow returns to S31. Each time when this flow returns to S31, the processing is executed for a different determination flag at S31. In the present embodiment, the MFP 10 is to be permitted to execute the program A-1, the program B-2, and the program C-1. When the execution of the program A-1 is permitted, the control program 35 executes processings illustrated in FIG. 9. When the operation device 24 accepts a user operation of tapping on the COPY icon displayed on the menu screen illustrated in FIG. 10A, the control program 35 causes the scanning device 12 to perform a scanning operation and executes the program B-2 to cause the printing device 11 to record an image based on image data obtained in the scanning operation. When the MFP 10 receives print data from an external device via the communication device 25, the control program 35 executes the program B-2 to cause the printing device 11 to record an image based on the print data. The control program 35 further executes the program C-1 to change a method of supplying electric power to the MFP 10.

FIG. 9 is a flow chart illustrating a flow in which the MFP 10 executes the program A-1 to acquire the token information from the relay device 70 identified by the relay device ID contained in the response information. This flow begins, for example, when the MFP 10 is permitted to execute the program A-1 in the restriction removal processing.

In the present embodiment, the token information is authentication information for establishing connection between the MFP 10 and the relay device 70 according to Extensible Messaging and Presence Protocol over Bidirectional-streams Over Synchronous HTTP (XMPP over BOSH). Also, in the present embodiment, it is assumed that the device ID identifying the MFP 10 as one example of an object client device is "MFC-A", and the relay device ID identifying the relay device 70 is "the relay device β".

Figure 10B:
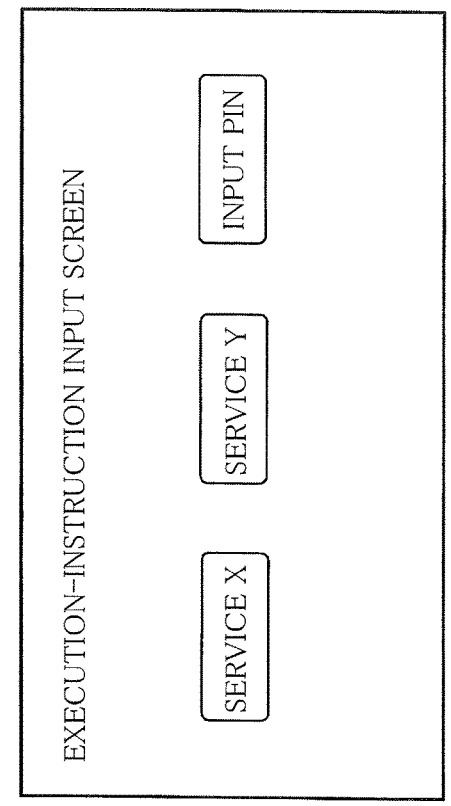
Figure 11A:
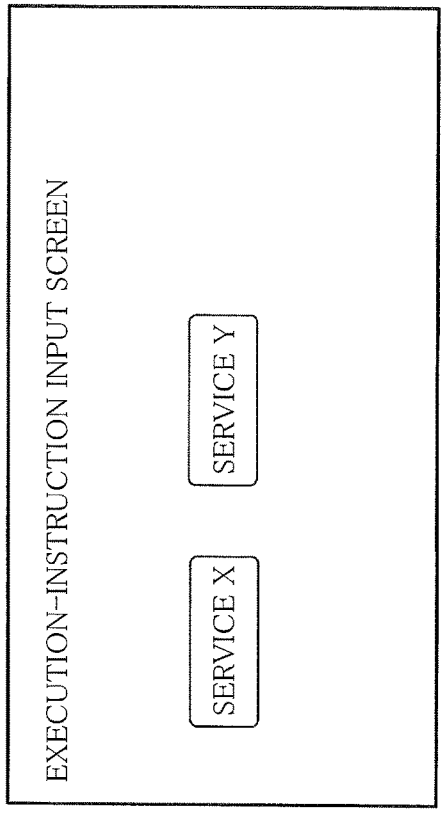

The flow illustrated in FIG. 9 begins with S41 at which the control program 35 displays an execution-instruction input screen on the display device 23. FIG. 10B illustrates one example of the execution-instruction input screen which is displayed in the case where the execution of the program A-1 is permitted in the restriction removal processing. FIG. 11A illustrates one example of the execution-instruction input screen which is displayed in the case where the execution of the program A-1 is not permitted in the restriction removal processing. The processing at S41 is one example of a first display process.

The execution-instruction input screen illustrated in FIG. 10B contains a service X icon, a service Y icon, and a PIN input icon. The service X icon is for receiving an instruction for execution of a program X. The service Y icon is for receiving an instruction for execution of a program Y. The PIN input icon is for receiving an instruction for execution of the program A-1. That is, the service X icon and the service Y icon are one example of a first object, and the PIN input icon is one example of a second object.

The execution-instruction input screen illustrated in FIG. 11A is similar to the execution-instruction input screen illustrated in FIG. 10B except for the PIN input icon being removed in the execution-instruction input screen illustrated in FIG. 11A. That is, in the present embodiment, permitting the execution of the program A-1 in the restriction removal processing indicates that the PIN input icon is displayed on the execution-instruction input screen. In the present embodiment, on the other hand, disallowing or not permitting the execution of the program A-1 in the restriction removal processing indicates that the PIN input icon is not displayed on the execution-instruction input screen. It should be understood that processings different from the above-described processings may be executed in the case where the restriction on the object program is removed in the restriction removal processing.

Figure 11B:
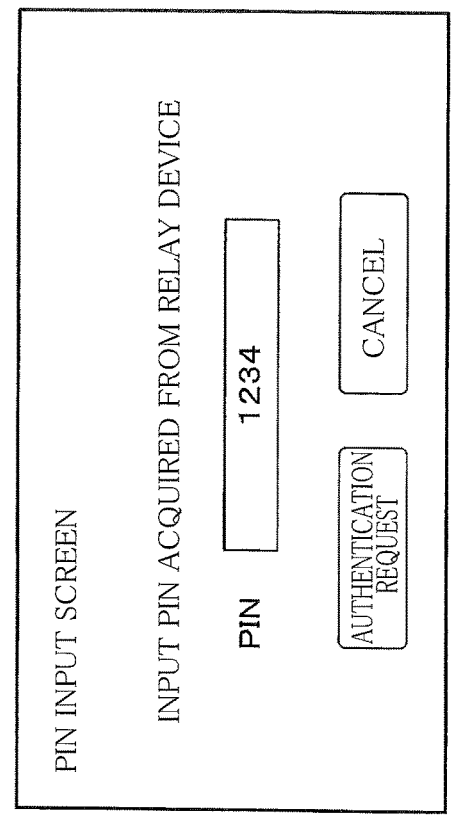

When the operation device 24 accepts a user operation of tapping on the PIN input icon (S42: Yes), the control program 35 at S43 displays a PIN input screen on the display device 23. FIG. 11B illustrates one example of the PIN input screen. The PIN input screen illustrated in FIG. 11B contains: a text box for input of the PIN; an authentication request icon; and a cancel icon. The processing at S43 is one example of a second display process. The processings at S41 and S43 are one example of a display control process.

When the operation device 24 accepts a user operation of tapping on the authentication request icon (S44: Yes), the control program 35 at S45 transmits the authentication request information containing the PIN "1234" input into the text box of the PIN input screen and the device ID "MFC-A" identifying the MFP 10, to the relay device 70 via the communication device 25. The authentication request information is transmitted, for example, to request the relay device 70 to authenticate whether the PIN input into the text box of the PIN input screen has been registered in the relay device 70 or not. The authentication request information transferred between the MFP 10 and the relay device 70 or the PIN contained in the authentication request information may be encrypted. The processing at S45 is one example of an authentication request process.

The destination of transmission of the authentication request information is the relay device 70 identified by the relay device ID "the relay device 13" contained in the response information. Specifically, the control program 35 reads the URL associated with the relay device ID "the relay device β" contained in the response information, from the data storage area 32B illustrated in FIG. 3C. The control program 35 transmits the authentication request information via the communication device 25 as a HTTP request to the URL.

When a control program 85 of the relay device 70 at S45 receives the authentication request information from the MFP 10 via the communication device 75, the control program 85 at S46 executes the authentication processing. Specifically, the control program 85 at S46 determines whether the PIN contained in the authentication request information is stored in the data storage area 82B illustrated in FIG. 5C or not. When the PIN contained in the authentication request information is stored in the data storage area 82B (S47: Yes), the control program 85 at S48 creates token information. Alternatively, the control program 85 may at S48 read the token information which is created and stored in the data storage area 82B in advance.

The control program 85 at S49 stores (i) the device ID contained in the authentication request information and (ii) the token information acquired at S48 into the data storage area 62B illustrated in FIG. 5D in a state in which the device ID and the token information are associated with each other. The processing at S49 is one example of a registration process. The control program 85 at S50 transmits the token information acquired at S48, to the MFP 10 via the communication device 75. The token information transferred between the MFP 10 and the relay device 70 may be encrypted. The processing at S50 is one example of an authentication information transmission process. It is noted that the processings at S49, S50 may be executed in an order different from that in the example in FIG. 9.

Upon reception of the token information from the relay device 70 via the communication device 25 (S50), the control program 35 of the MFP 10 at S51 stores (i) the relay device ID "the relay device β" of the relay device 70 having received the authentication request information at S45 and (ii) the token information received at S50, into the data storage area 32B illustrated in FIG. 3D in a state in which the relay device ID and the token information are associated with each other. The processing at S51 is one example of a storage control process.

The control program 35 at S52 uses the token information received at S50 to establish connection with the relay device 70, following a procedure according to XMPP over BOSH. It is noted that this connection may be hereinafter referred to as "XMPP connection". The processing at S52 is one example of a connection establishment process. XMPP over BOSH is a protocol which always maintains a state in which the connection is established. It should be understood that the protocol for establishing connection between the MFP 10 and the relay device 70 is not limited to XMPP over BOSH. Examples of such protocol include protocols for establishing connection, protocols for continuous connection, and protocols for maintaining connection.

The XMPP connection is connection for transmission of a request from the relay device 70 to the MFP 10 via the router 102A (noted that this operation corresponds to what is called server push). It is noted that the XMPP connection is disconnected when a predetermined connection maintaining period has passed. When a re-connection period shorter than the connection maintaining period has passed, for example, the control program 35 establishes the XMPP connection with the relay device 70. The XMPP connection is maintained by the MFP 10 while power is being supplied to the MFP 10, for example.

Any information may be transmitted from the relay device 70 to the MFP 10 over the XMPP connection, and one example of such information is service use information which is used for the MFP 10 to use external service provided by an external-service providing device, not shown. That is, when the control program 85 of the relay device 70 receives the service use information from the external-service providing device via the communication device 75, the control program 85 transmits the service use information to the MFP 10 over the XMPP connection. This processing is one example of a relay process.

Any service may be provided by the external-service providing device, and examples of the service include a cloud print processing and a Scan-to-Cloud processing. In the cloud print processing, the MFP 10 receives image data from the external-service providing device, and the printing device 11 records an image based on the image data. In the Scan-to-Cloud processing, the scanning device 12 performs a scan operation and sends the external-service providing device the image data created in the scan processing.

When the PIN contained in the authentication request information is not stored in the data storage area 82B (S47: No), the control program 85 at S53 transmits error information to the MFP 10 via the communication device 75. The error information indicates that the PIN contained in the authentication request information is not registered in the relay device 70. When the control program 35 of the MFP 10 at S53 receives the error information from the relay device 70 via the communication device 25, the control program 35 at S54 displays an error screen, not shown, on the display device 53. The error screen contains a message indicating that the PIN input in the PIN input screen is not correct, for example.

Effects

Each region is assigned with a predetermined range of the global IP addresses. That is, in the communication system 100 according to the above-described embodiment, the server device 50 can refers to the global IP address that is set in the IP packet containing the inquiry information, to identify a region in which the MFP 10 having transmitted the inquiry information is placed. Also, the server device 50 determines whether the execution of the object program is permitted or not based on whether the global IP address is contained in the permission range or not. This configuration allows the MFP 10 to achieve functions suitable for the region in which the MFP 10 is placed.

In particular, the execution of the program A-1 is permitted only for the MFP 10 placed in the region contained in the permission range, making it possible to appropriately operate the MFP 10 according to a situation of the region in which the MPF 10 is placed. Also, the destination of transmission of the authentication request information is designated from among the relay devices 70, 70A in the identification processing. This configuration can achieve appropriate load distribution according to, e.g., distribution of population of users who use the external service via the relay devices 70, 70A. Furthermore, the support range for each of the relay devices 70, 70A can be changed, and the changed support range is transmitted to the server device 50.

This configuration allows the server device 50 to execute appropriate processings even in the case of increase or expansion of a region in which use of the external service is permitted.

The determination processing and the identification processing are not limited to those in FIG. 7. For example, the control program 65 of the server device 50 may compare the object global IP address and the support range information illustrated in FIG. 4B with each other to determine whether the execution of the program A-1 is permitted or not and identify the relay device 70 at the same time. That is, when the support range information in which the object global IP address is contained in the support range is stored, the control program 65 may set "OK" for the determination flag corresponding to the program A-1 and identify the relay device ID corresponding to the support range information. When the support range information in which the object global IP address is contained in the support range is not stored, the control program 65 may set "NG" for the determination flag corresponding to the program A-1.

The support range information acquired from each of the relay devices 70, 70A does not necessarily need to be stored in the data storage area 62B. In the identification processing, for example, the control program 65 may transmit support inquiry information containing the object global IP address, to each of the relay devices 70, 70A via the communication device 55. Upon reception of the support inquiry information from the server device 50 via the communication device 75, the control program 85 of the relay device may compare the object global IP address contained in the support inquiry information, with the support range information stored in the data storage area 82B. When the object global IP address is contained in the support range, the control program 85 of the relay device 70 may transmit support notification information containing the relay device ID identifying the relay device 70, to the server device 50 via the communication device 75. When the control program 65 of the server device 50 receives the support notification information from the relay device 70 via the communication device 55, the control program 65 may incorporate the relay device ID contained in the support notification information, into the response information.

Information contained in the response information for identification of the relay device 70 of the destination of transmission of the authentication request information is not limited to the relay device ID and may be a URL which indicates the location of the relay device 70. That is, the control program 35 of the MFP 10 may at S45 transmit the authentication request information via the communication device 25 as a HTTP request to the URL contained in the response information. The URL contained in the response information is another example of authentication-device identification information. In this case, the URL illustrated in FIG. 3C does not need to be stored in the data storage area 32B.

In the above-described embodiment, the plurality of program IDs are contained in the inquiry information, allowing the server device 50 to appropriately determine whether execution of each of the plurality of the object programs is permitted or not. Also, some of the object programs are respectively associated with the alternative programs, allowing the MFP 10 to have functions suitable for the region in which the MFP 10 is placed. However, permission of execution of each object program may be inquired at different timings. For example, permission of execution of the program A-1 may be inquired, as in the above-described embodiment, at the timing when the WEB icon of the menu screen is tapped. Permission of execution of the programs B-1, C-1 may be inquired at an initial setting of the MFP 10 (e.g., when the MFP 10 is connected to the LAN 102 for the first time. With these configurations, permission of execution of each of the object programs and each of the alternative programs can be determined at an appropriate timing.

In the MFP 10, the server device 50, or the relay device 70, the CPUs 31, 61, 81 execute various programs stored in the program storage areas 32A, 62A, 82A of the respective storage device 32, 62, 82, to execute processings to be executed by the controller. However, the configuration of the controller is not limited to this configuration. For example, the controller may be partly or entirely configured by hardware such as an integrated circuit (IC).

The present invention is achieved by the MFP 10, the server device 50, or the relay device 70 in the above-described embodiment but may be achieved by programs for causing the MFP 10, the server device 50, or the relay device 70 to execute processings. The programs may be stored in a non-transitory storage medium. Examples of the non-transitory storage medium include, in addition to a CD-ROM and a DVD-ROM, a storage device mounted on a server device connectable to the MFP 10, the server device 50, or the relay device 70 over the communication network. The programs stored in the storage device of the server device may be distributed, as information or signals representing the programs, over the communication network such as the Internet.

What is claimed is:
1. A communication system, comprising:
a client device; and
a server comprising:
   a first communication device configured to be electrically connected with the client device in a method which complies with an IP protocol;
   a first storage storing first address information specifying at least one first global IP address; and
   a first controller configured to execute:
      a first reception process for receiving an IP packet from the client device via the first communication device, the IP packet containing first information, a second global IP address being set in the received IP packet;
      a determination process for determining whether the second global IP address set in the received IP packet coincides with one of the at least one first global IP address specified by the first address information; and
      a second information transmission process for transmitting second information to the client device via the first communication device, when the first controller determines in the determination process that the second global IP address coincides with one of the at least one first global IP address,
the client device comprising:
   a second communication device configured to be electrically connected with the server connected to the Internet, in a method which complies with the IP protocol;
   a program storage configured to store an object program; and
   a second controller configured to execute:
      a first information transmission process for transmitting the first information to the server via the second communication device when the client device is in a restricted state in which the client device is not permitted to execute the object program;

a second reception process for receiving the second information from the server via the second communication device; and a restriction cancellation process for canceling the restricted state of the client device, when the second controller receives the second information in the second reception process.

2. The communication system according to claim 1, further comprising:

a plurality of the client devices; and an authentication device connected to the Internet, wherein each of the plurality of the client devices comprises:

a display device;

an operation device configured to accept a user operation; and an authentication information storage, the second controller of the client device being configured to, according to the object program, of which execution is permitted in the restriction cancellation process, execute:

a display control process for controlling the display device to display a user-identification-information input screen for input of first user identification information;

a first acceptance process for accepting a first user operation of inputting the first user identification information, via the operation device;

an authentication request process for transmitting authentication request information to the authentication device via the second communication device, when the second controller accepts the first user operation in the first acceptance process, the authentication request information containing: client identification information identifying the client device; and the user identification information accepted by the operation device;

a third reception process for receiving authentication information from the authentication device via the second communication device, the authentication information being issued by the authentication device; and a storage control process for storing the authentication information into the authentication information storage, when the second controller receives the authentication information in the third reception process, and wherein the authentication device comprises:

a third communication device configured to be electrically connected with the client device;

a user identification information storage storing second user identification information;

a client identification information storage; and a third controller configured to execute:

a fourth reception process for receiving the authentication request information from the client device via the third communication device;

an authentication process for determining whether the first user identification information coincides with the second user identification information stored in the user identification information storage, when the third controller receives the authentication request information in the fourth reception process;

an authentication information transmission process for transmitting the authentication information to the client device via the third communication device, when the third controller determines in the authentication process that the first user identification information coincides with the second user identification information; and a registration process for storing client identification information contained in the authentication request information and the authentication information transmitted to the client device, into the client identification information storage, the client identification information being associated with the authentication information while stored in the client identification information storage.

3. The communication system according to claim 2, further comprising a plurality of the authentication devices, wherein the first storage stores the first address information specifying a plurality of the first global IP addresses, as the at least one first global IP address, each of which is associated with a corresponding one of the plurality of the authentication devices, wherein the first controller of the server is configured to:

execute an identification process for identifying one authentication device from among the plurality of the authentication devices, the one authentication device being associated with a specific first global IP address which is one of the plurality of the first global IP addresses and coincides with the second global IP address, and in the second information transmission process, transmit the second information to the client device via the first communication device, the second information containing authentication-device identification information identifying the one authentication device identified in the identification process, and wherein the second controller of the client device is configured to transmit the authentication request information to the one authentication device via the second communication device in the authentication request process.

4. The communication system according to claim 3, wherein the client device comprises a URL storage configured to, for each of the plurality of the authentication devices, store the authentication-device identification information and an URL indicating a location of the authentication device, and wherein in the authentication request process, the second controller of the client device transmits the authentication request information via the second communication device as a HTTP request to the URL stored in the URL storage in association with the authentication-device identification information contained in the second information.

5. The communication system according to claim 3, wherein the authentication-device identification information is an URL indicating a location of the authentication device, and wherein in the authentication request process, the second controller of the client device transmits the authentication request information via the second communication device, as a HTTP request to the URL contained in the second information.

6. The communication system according to claim 3, wherein the first controller of the server is configured to execute:

a second address information reception process for receiving second address information from the plurality of the authentication devices via the first communication device, the second address information specifying at least one third global address; and
a second determination process for determining whether the specific first global IP address coincides with one of the at least one third global address, and
wherein in the identification process, the first controller identifies, as the one authentication device, one of the plurality of the authentication devices which has transmitted the second address information specifying the one of the at least one third global address which coincides with the specific first global IP address.

7. The communication system according to claim 2,
wherein the program storage is configured to store a specific program for use of a specific service provided by a specific service providing device accepted in advance, and
wherein the second controller of the client device is configured to, in the display control process, execute:
 a first display process for controlling the display device to display an execution-instruction input screen containing (i) a first object for accepting an instruction for execution of the specific program and (ii) a second object for accepting an instruction for execution of the authentication request process; and
 a second display process for controlling the display device to display the user-identification-information input screen when the operation device accepts a user operation of selecting the second object.

8. The communication system according to claim 2,
wherein the second controller of the client device is configured to execute a connection establishment process for using the authentication information stored in the authentication information storage to establish connection between the client device and the authentication device,
wherein the third communication device of the authentication device is capable of communicating with an external-service providing device configured to provide an external service, and
wherein the third controller of the authentication device is configured to execute:
 a fifth reception process for receiving service use information from the external-service providing device via the third communication device, the service use information being for use of the external service; and
 a relay process for transmitting the service use information to the client device over the connection established by the client device, when the third controller receives the service use information in the fifth reception process.

9. The communication system according to claim 1,
wherein the program storage of the client device is configured to store a plurality of the object programs,
wherein the first storage of the server stores plural sets of the first address information respectively corresponding to the plurality of the object programs,
wherein in the determination process, the first controller of the server determines, for each of the plural sets of the first address information, whether the second global IP address coincides with one of the at least one first global IP address specified by a corresponding one of the plural sets of the first address information,
wherein in the second information transmission process, the first controller of the server transmits the second information to the client device via the first communication device, and the second information contains program identification information identifying a specific object program,
wherein the specific object program is one of the plurality of the object programs which corresponds to specific first address information,
wherein the specific first address information is one of the plural sets of the first address information which contains one of the at least one first global IP address for which the first controller determines in the determination process that the one of the at least one first global IP address coincides with the second global IP address, and
wherein the second controller of the client device is configured to permit execution of the specific object program in the restriction cancellation process.

10. The communication system according to claim 1,
wherein the program storage of the client device is configured to store an alternative program which achieves a function as an alternative to a portion of a function achieved by the object program,
wherein when the first controller of the server determines in the determination process that the second global IP address does not coincide with one of the at least one first global IP address, the first controller executes a third information transmission process in which the first controller transmits third information to the client device via the first communication device, and
wherein the second controller of the client device is configured to execute:
 a sixth reception process for receiving the third information from the server via the second communication device; and
 a state setting process for receiving the third information via the second communication device, the second controller permits the client device to execute the alternative program.

11. The communication system according to claim 1,
wherein the client device is on a LAN connected to the Internet,
wherein the communication system further comprises a router configured to relay communication between the LAN and the Internet, and
wherein a global IP address assigned to the router is set in the IP packet containing the first information.

12. The communication system according to claim 1,
wherein the client device comprises an operation device configured to accept a user operation, and
wherein the second controller is configured to execute the first information transmission process when the operation device accepts a user operation of instructing execution of the object program.

13. The communication system according to claim 1,
wherein the client device comprises an address storage configured to store location information indicating a location of the server, and
wherein in the first information transmission process, the second controller transmits the first information via the second communication device to the server indicated by the location information stored in the address storage.

14. A server, comprising:
a communication device configured to be electrically connected with a client device in a method which complies with an IP protocol;
a storage storing first address information specifying at least one first global IP address; and
a controller configured to execute:
  a first reception process for receiving an IP packet from the client device via the communication device, the IP packet containing first information, a second global IP address being set in the received IP packet;
  a determination process for determining whether the second global IP address set in the received IP packet coincides with one of the at least one first global IP address specified by the first address information; and
  a notification process for transmitting second information to the client device via the communication device when the controller determines in the determination process that the second global IP address coincides with one of the at least one first global IP address, the second information being used for the client device to remove restriction on execution of the object program.

15. A client device, comprising:
a communication device configured to be electrically connected with a server connected to the Internet, in a method which complies with an IP protocol;
a program storage configured to store an object program; and
a controller configured to execute:
  a first information transmission process for transmitting first information to the server via the communication device when the client device is in a restricted state in which the client device is not permitted to execute the object program;
  a second reception process for receiving second information from the server via the communication device; and
  a restriction cancellation process for canceling the restricted state of the client device when a second global IP address for the client device coincides with at least one first global IP address stored in the server and when the controller receives the second information in the second reception process.

16. The client device according to claim 15,
wherein the communication device is configured to be electrically connected with an authentication device connected to the Internet,
wherein the client device comprises:
  a display device;
  an operation device configured to accept a user operation; and
  an authentication information storage capable of storing authentication information issued by the authentication device, and
wherein the controller of the client device is configured to, according to the object program, of which execution is permitted in the restriction cancellation process, execute:
  a display control process for controlling the display device to display a user-identification-information input screen for input of first user identification information;
  a first acceptance process for accepting a first user operation of inputting the first user identification information, via the operation device;
  an authentication request process for transmitting authentication request information to the authentication device via the communication device when the controller accepts the first user operation in the first acceptance process, the authentication request information containing: client identification information identifying the client device; and the user identification information accepted by the operation device;
  a third reception process for receiving the authentication information from the authentication device via the communication device; and
  a storage control process for storing the authentication information into the authentication information storage when the controller receives the authentication information in the third reception process.

17. The client device according to claim 16,
wherein the client device comprises a URL storage configured to, for each of a plurality of the authentication devices, store the authentication-device identification information and an URL indicating a location of the authentication device, and
wherein in the authentication request process, the controller of the client device transmits the authentication request information via the communication device as a HTTP request to the URL stored in the URL storage in association with the authentication-device identification information contained in the second information.

18. The client device according to claim 16,
wherein the authentication-device identification information is an URL indicating a location of the authentication device, and
wherein in the authentication request process, the controller of the client device transmits the authentication request information via the communication device, as a HTTP request to the URL contained in the second information.

19. The client device according to claim 16,
wherein the program storage is configured to store a specific program for use of a specific service provided by a specific service providing device accepted in advance, and
wherein the controller of the client device is configured to, in the display control process, execute:
  a first display process for controlling the display device to display an execution-instruction input screen containing (i) a first object for accepting an instruction for execution of the specific program and (ii) a second object for accepting an instruction for execution of the authentication request process; and
  a second display process for controlling the display device to display the user-identification-information input screen when the operation device accepts a user operation of selecting the second object.

20. A communication system, comprising:
a client device; and
a server comprising:
  a first communication device configured to be electrically connected with the client device in a method which complies with an IP protocol;
  a first storage storing first address information specifying at least one first global IP address; and
  a first controller configured to execute:
    a first reception process for receiving an IP packet from the client device via the first communication device, the IP packet containing first information, a second global IP address being set in the received IP packet;

a determination process for determining whether the second global IP address set in the received IP packet coincides with one of the at least one first global IP address specified by the first address information;
a second information transmission process for transmitting second information to the client device via the first communication device when the first controller determines in the determination process that the second global IP address coincides with one of the at least one first global IP address; and
a third information transmission process for transmitting third information to the client device via the first communication device when the first controller determines in the determination process that the second global IP address does not coincide with the at least one first global IP address, the client device comprising:
a second communication device configured to be electrically connected with the server connected to the Internet, in a method which complies with the IP protocol; and
a second controller configured to execute:
a first information transmission process for transmitting the first information to the server via the second communication device;
a second reception process for receiving the second information from the server via the second communication device;
a first setting process for establishing a setting in which the client device is permitted to execute a first process, when the second controller receives the second information in the second reception process;
a third reception process for receiving the third information from the server via the second communication device; and
a second setting process for establishing a setting in which the client device is permitted to execute a second process, when the second controller receives the third information in the second reception process.

* * * * *